United States Patent
Han et al.

(10) Patent No.: US 8,926,029 B2
(45) Date of Patent: Jan. 6, 2015

(54) CONSOLE HAVING CABINET AND SUPPORT STRUCTURE

(75) Inventors: Samuel Han, Alberta (CA); Shannon Lundrigan, Alberta (CA); Matko Papic, Alberta (CA)

(73) Assignee: Evans Consoles Corporation, Alberta (CA)

( * ) Notice: Subject to any disclaimer, the term of this patent is extended or adjusted under 35 U.S.C. 154(b) by 0 days.

(21) Appl. No.: 12/826,097

(22) Filed: Jun. 29, 2010

(65) Prior Publication Data

US 2011/0001406 A1    Jan. 6, 2011

Related U.S. Application Data

(60) Provisional application No. 61/221,264, filed on Jun. 29, 2009.

(51) Int. Cl.
| | |
|---|---|
| *A47B 21/00* | (2006.01) |
| *F16M 13/02* | (2006.01) |
| *A47B 47/02* | (2006.01) |
| *F16M 11/04* | (2006.01) |
| *F16M 11/06* | (2006.01) |
| *F16M 11/10* | (2006.01) |

(52) U.S. Cl.
CPC .............. *F16M 13/02* (2013.01); *A47B 47/02* (2013.01); *F16M 11/046* (2013.01); *F16M 11/06* (2013.01); *F16M 11/10* (2013.01); *F16M 13/022* (2013.01); *F16M 2200/028* (2013.01)
USPC .......................... 312/196; 312/223.3; 312/108

(58) Field of Classification Search
CPC ...... A47B 17/00; A47B 17/003; A47B 21/00; A47B 21/0314; A47B 21/06; A47B 47/02; A47B 83/001; A47B 87/02; A47B 2200/0078; A47B 2200/0085; A47B 2037/005
USPC ................ 312/223.3, 194–196, 265.1–265.4, 312/257.1, 223.6, 108; 108/50.01, 50.02
See application file for complete search history.

(56) References Cited

U.S. PATENT DOCUMENTS 4,090,755 A    5/1978 Johnson
4,296,981 A *  10/1981 Hildebrandt et al. ......... 312/194
(Continued)

FOREIGN PATENT DOCUMENTS

EP    963719 A2 * 12/1999 ............. A47B 83/00
JP    10105284        4/1998

OTHER PUBLICATIONS

Canadian Search report for Application No. 2,708,465.

*Primary Examiner* — Darnell Jayne
*Assistant Examiner* — Ryan A Doyle
(74) *Attorney, Agent, or Firm* — Notaro, Michalos & Zaccaria P.C.

(57) ABSTRACT

The present invention relates to a framework for supporting pieces of work station equipment, and in particular to a console structure for supporting electronic equipment such as computers, video displays, control panels and the like. The present disclosure provides a console structure generally comprising a cabinet structure and a support structure. The cabinet structure generally defines an interior space for receiving equipment, whereas the support structure is typically disposed at the back side of the cabinet and extends above the cabinet for supporting equipment on the exterior of the cabinet. In at least one embodiment, the console has reduced dimensions to provide enhanced downward sightlines over the console. Furthermore, in at lease one embodiment, the interior dimensions of the cabinet structure are maximized by providing a cabinet frame comprised of one or more compact frame members.

28 Claims, 6 Drawing Sheets

(56) References Cited

U.S. PATENT DOCUMENTS

| | | | | |
|---|---|---|---|---|
| 5,071,204 | A | 12/1991 | Price et al. | |
| 5,083,512 | A * | 1/1992 | Newhouse et al. | 108/50.02 |
| 5,499,868 | A | 3/1996 | Schainholz | |
| D368,388 | S | 4/1996 | Schainholz | |
| 5,609,402 | A * | 3/1997 | Kemp | 312/265.4 |
| 5,678,907 | A | 10/1997 | Schainholz | |
| 5,746,488 | A | 5/1998 | LaCour | |
| 5,975,657 | A * | 11/1999 | LaCour | 312/196 |
| 6,050,659 | A | 4/2000 | LaCour | |
| 6,076,474 | A * | 6/2000 | Grabowski et al. | 108/50.02 |
| 6,076,903 | A * | 6/2000 | Vander Park | 312/196 |
| 6,152,048 | A * | 11/2000 | Vander Park | 108/50.02 |
| 6,176,561 | B1 * | 1/2001 | Roels et al. | 312/223.6 |
| 6,199,705 | B1 * | 3/2001 | Portner | 211/26 |
| 6,382,747 | B1 | 5/2002 | Catta et al. | |
| 6,712,433 | B2 * | 3/2004 | Hellwig et al. | 312/223.6 |
| 6,789,859 | B1 * | 9/2004 | Ho | 312/257.1 |
| 6,990,909 | B2 * | 1/2006 | Gosling et al. | 108/50.02 |
| 7,472,971 | B2 * | 1/2009 | Schmieder et al. | 312/223.3 |
| 7,712,847 | B1 * | 5/2010 | Albright et al. | 312/209 |
| 2005/0040743 | A1 * | 2/2005 | Powell | 312/257.1 |
| 2006/0081156 | A1 * | 4/2006 | Gayhart et al. | 108/50.02 |
| 2006/0179458 | A1 * | 8/2006 | Schmieder et al. | 725/78 |
| 2008/0265724 | A1 * | 10/2008 | Robins | 312/223.3 |
| 2009/0273260 | A1 * | 11/2009 | Kemp | 312/223.3 |
| 2010/0327137 | A1 * | 12/2010 | Han et al. | 248/371 |

* cited by examiner

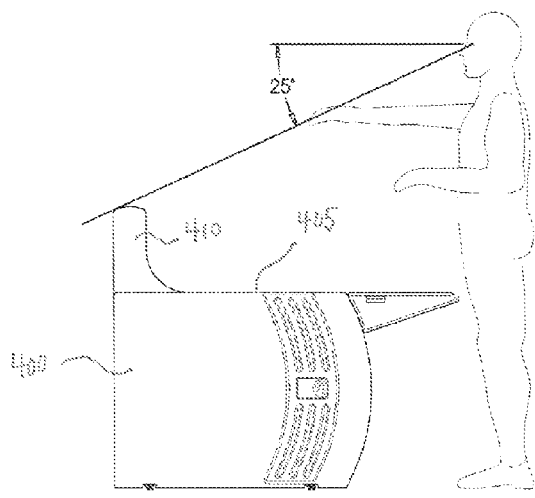 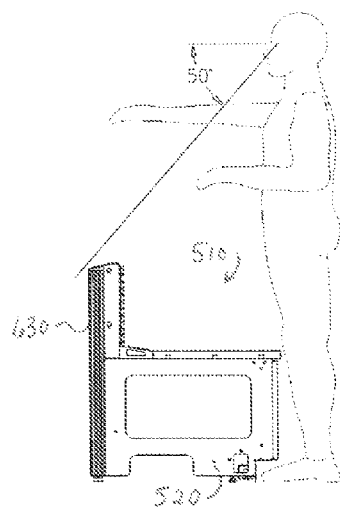
FIG. 7A
(PRIOR ART)
FIG. 7B
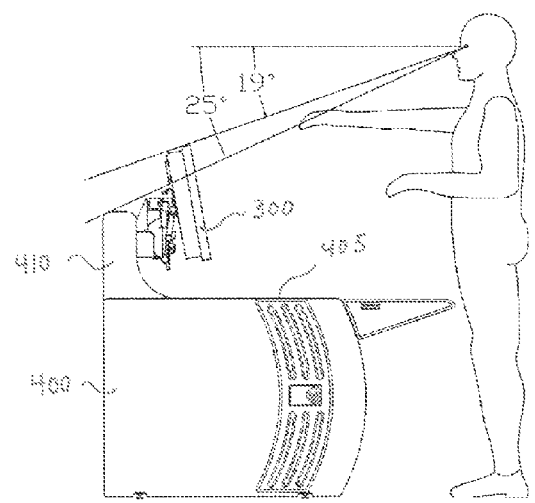 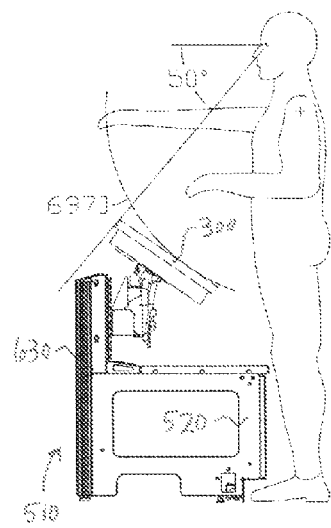
FIG. 8A
(PRIOR ART)
FIG. 8B

CONSOLE HAVING CABINET AND SUPPORT STRUCTURE

CROSS-RELATED APPLICATION

The present application claims priority under Title 35, §U.S.C. 119(e) on U.S. provisional application No. 61/221,264, filed Jun. 29, 2009, which is incorporated here by reference.

FIELD

The present invention relates to a framework for supporting pieces of work station equipment, and in particular to a console structure for supporting electronic equipment such as computers, video displays, control panels and the like.

BACKGROUND

Consoles are known in the art. One class of console generally comprises a framework that defines at least one lower cabinet for receiving and supporting equipment, such as computer and other electronic equipment. Consoles are used in a variety of different applications, including in control rooms, on trading floors, and in operations centers. Consoles are typically used in the place of generic office equipment as consoles offer several advantages. A first advantage is that consoles provide an enhanced human machine interface by positioning equipment in the most useful and efficient positions. Consoles are often purpose-built for use in a specific application. A second advantage of consoles is that they can be adapted to receive large amounts of equipment at each work station.

One type of console generally known in the art is designed for use in observation or control type applications where there is a need for a person positioned at the console to see over the console. There may be a need to see over the console at a downward angle when the console is positioned at a vertically elevated position to provide superior viewpoints. A console that affords good sightlines over the console is sometimes referred to as a "low profile" console. A low profile console may be suitable for use on a bridge of a ship, in a prison control room, on a trading floor, or in an air traffic control tower. Consoles of this type generally comprise a lower cabinet and a work surface disposed on or above the cabinet. The work surface can be used for any number of purposes including, among other things, to support various types of equipment, such as displays, keyboards, telephones, turrets, printers and writing surfaces. Some existing consoles define a receiving portion at or in the work surface for partly or wholly receiving a display or other piece of equipment. The positioning of the display partly or wholly in the receiving portion reduces or eliminates the height by which the display extends above the work surface, thereby providing an operator with a better sightline over the display and console. Other consoles support one or more displays wholly above the work surface. For example, some consoles have a support structure disposed at or near the rear side of the console on which a display or other equipment can be mounted. One example is shown in FIGS. 7A and 8A. Known types of support structures include mounting rails, and low rising mounting walls such as a slatwalls or pegboards.

Previous consoles have been designed to ensure ergonomic standards were met with respect to a seated person for issues such as knee well space and work surface height. Continuous improvements have been made to previous consoles to allow for the work surface to be raised and lowered, allowing the person the option to either sit or stand at their respective workstations. However, the fundamental console design of emulating a desk has not changed.

One general limitation of known low profile consoles is that the height, depth, or combination of height and depth of the consoles restricts the downwardly directed sightlines of an operator over the console. For example, a person's downward sightlines will improve as the depth of the console is reduced. Similarly, the downward sightlines will also improve as the height of the console is reduced. However, a number of requirements have generally limited the amount by which the dimensions of consoles have been reduced. Although a reduction in the size of a console would increase the sightlines over the console, other practicalities generally come into play. For instance, the need for equipment storage and cable management is usually a limitation. If the dimensions of a console are reduced by too much, the console may not be capable of receiving all of the necessary equipment. Furthermore, many existing consoles have large or otherwise bulky frame members that reduce the amount of available space within the console.

Another practicality is that the top side of most consoles serves as a work surface, meaning that the top of the console must be at an ergonomically acceptable level. Therefore reducing the height of a console below a certain point has not been a practical option in the past.

For the foregoing reasons, it can be appreciated that a need exists for a console that maximizes its available interior space. There is also a need for a console with reduced outer dimensions but that still possesses all of the functionality required in a console such as the accommodation and efficient positioning of all of the required equipment. A need also exists for a console that provides improved sightlines over the console without significantly compromising equipment storage and support capabilities. A need also exists for a console that is capable of supporting heavy loads.

SUMMARY

The present disclosure provides a console structure for supporting equipment and other accessories. The console structure comprises a cabinet structure and a support structure. The cabinet structure generally defines an interior space for receiving equipment, whereas the support structure is typically disposed at the back side of the cabinet and extends above the cabinet for supporting equipment on the exterior of the cabinet.

One object of the present invention is to provide a console with reduced or minimized exterior dimensions while maintaining all of the functionality required in a console such as the accommodation and efficient positioning of all of the required equipment and accessories.

Another object of the present invention is to provide a console that maximizes the available interior space of the console.

Another object of the present invention is to provide a console having compact frame members to maximize the available interior space of the console.

Another object of the present invention is to provide a console that allows for greater sightlines over the console.

Another object of the present invention is to provide a console that is capable of supporting heavy loads.

Another object of the present invention is to provide a console having effective and efficient cable management features.

Another object of the present invention is to provide a console that has ventilation means for ventilating the cabinet of the console.

According to the present invention then, there is provided a console structure for supporting equipment, the console comprising a cabinet structure having a front side, a back side and a top side, the cabinet structure comprising two spaced apart frame ends, a first upper stringer disposed between and connected to the frame ends and positioned at a spaced apart location from the back side of the cabinet structure, and a first lower stringer disposed between and connected to the frame ends and positioned at a spaced apart location from the back side of the cabinet structure, the cabinet structure defining an interior space for receiving equipment; and a support structure disposed at the back side of the cabinet structure, the support structure comprising two spaced apart posts, and a lateral support having a front side and a back side, each post having an upper portion and a lower portion, the upper portions of the posts extending above the top side of the cabinet structure and the lateral support disposed between and connected to the upper portions of the posts, and the lower portion of each post connected to a one of the frame ends.

In another aspect, the interior dimensions of the cabinet structure are maximized by providing a cabinet frame comprised of compact frame members. This allows the outer dimensions of the cabinet structure to be reduced without sacrificing interior volume of the cabinet.

In another aspect, the cabinet of the console can have a lower height than most of those existing consoles. The tops of existing consoles typically define a work surface that is positioned at a height that allows a person in a sitting position to utilize the work surface. The work surface is generally used to support various pieces of equipment, such as keyboards, displays, telephones, and also as general work area for paperwork, etc. The height of work surfaces of such consoles is ergonomically accepted as typically between 28 and 29 inches from the floor for a 95th percentile male. Often these consoles will define a space under the work surface capable of receiving a person's legs, which allows the person to position himself or herself close to work surface. In contrast, in one aspect of the present invention, the cabinet structure has a reduced height compared to those of most existing consoles. The reduced height can, for example, result in better sightlines for a person positioned at the console. Because the top of the cabinet is lower, it is not necessarily used as a primary work surface. Equipment, work surfaces and other objects are mounted on the support structure of the console, typically above the cabinet structure of the console. It is in this way that equipment and work surfaces are positioned at usable heights for persons in a sitting or standing position.

BRIEF DESCRIPTION OF THE DRAWINGS

Preferred embodiments of the present invention will now be described in greater detail and will be better understood when read in conjunction with the drawings in which:

FIG. 7A is a side view of a prior art console;

FIG. 7B is a side view of the embodiment of the console shown in FIG. 1;

FIG. 8A is a side view of a prior art console shown in FIG. 7A with a display mounted thereon; and FIG. 8B is a side view of the console shown in FIG. 7B with a display mounted thereon.

DETAILED DESCRIPTION

In some applications, it is desirable to have a console that has reduced dimensions, such as a reduced height and/or depth. For example, this may be the case where there is a need to maximize a person's sightlines over the console. However, there will typically also be a need to maintain all of the functionality required in a console such as the accommodation and efficient positioning of all of the required equipment and accessories.

In order to accommodate various types of equipment and user requirements, the console of the present invention is provided with a lower cabinet structure and a support structure. The combination of the cabinet structure and the support structure provides for a smaller console while at the same time maintaining all of the functionality required in a console such as the accommodation and efficient positioning of the necessary equipment and accessories. In addition, the combination of the cabinet structure and the support structure of the present invention results in a console having considerable strength and rigidity. In terms of dimensions, the lower cabinet structure can be configured to various heights and depths to suit a user's requirements. Similarly, the support structure can also be configured to various heights depending on the equipment and user requirements.

The various features and components of the present console are now described with reference to the Figures.

Figure 1:
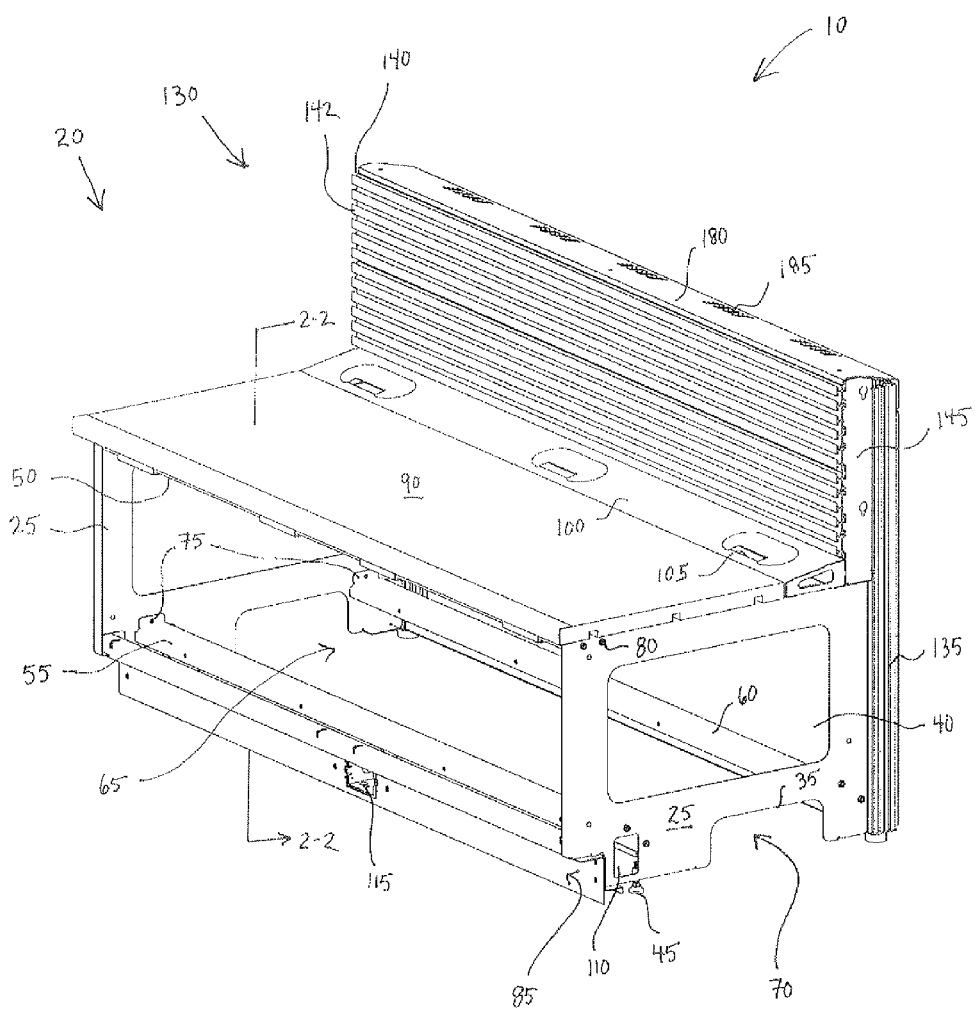
FIG. 1 is a front perspective view of one embodiment of the console of the present invention.

FIG. 1 shows one embodiment of the low profile console in accordance with the present invention. The console 10 generally comprises two subassemblies: a cabinet structure 20 and support structure 130. These subassemblies of one embodiment of console 10 are shown separately in FIGS. 4 and 5, respectfully. Each of these subassemblies is now described in detail.

Cabinet structure 20 comprises two frame ends 25, a first upper stringer 50 and a first lower stringer 55, wherein the stringers are disposed between and are connected to frame ends 25. These components generally define an interior space 65 of cabinet structure 20 for receiving equipment.

For descriptive purposes, the side of cabinet structure 20 at which support structure 130 is positioned will be referred to as the back side of the cabinet, whereas the opposite side will be referred to as the front side.

The components that form the frame of cabinet structure 20 can be shaped and dimensioned to be compact. In other words, the frame members can be designed to occupy a small amount of space in order to maximize the interior space of the cabinet. In at least one embodiment, as shown in the Figures, frame ends 25 are formed substantially from thin sheet material and are substantially flat. It should be apparent that the shape and thinness of these particular frame ends play a part in maximizing the available interior space 65 of the cabinet. It is to be understood, however, that frame ends 25 shown in the Figures are meant as an example only and are not meant to limit the scope of the present disclosure. As will be appreciated by those skilled in the art, the frame ends of the present console may be made of non-sheet material and may also have other suitable shapes.

In addition, frame ends 25 may comprise one or more openings or apertures 40 therethrough in order to reduce the amount of material required and to also allow for the passage of cabling and other equipment between adjacent consoles.

Figure 4:
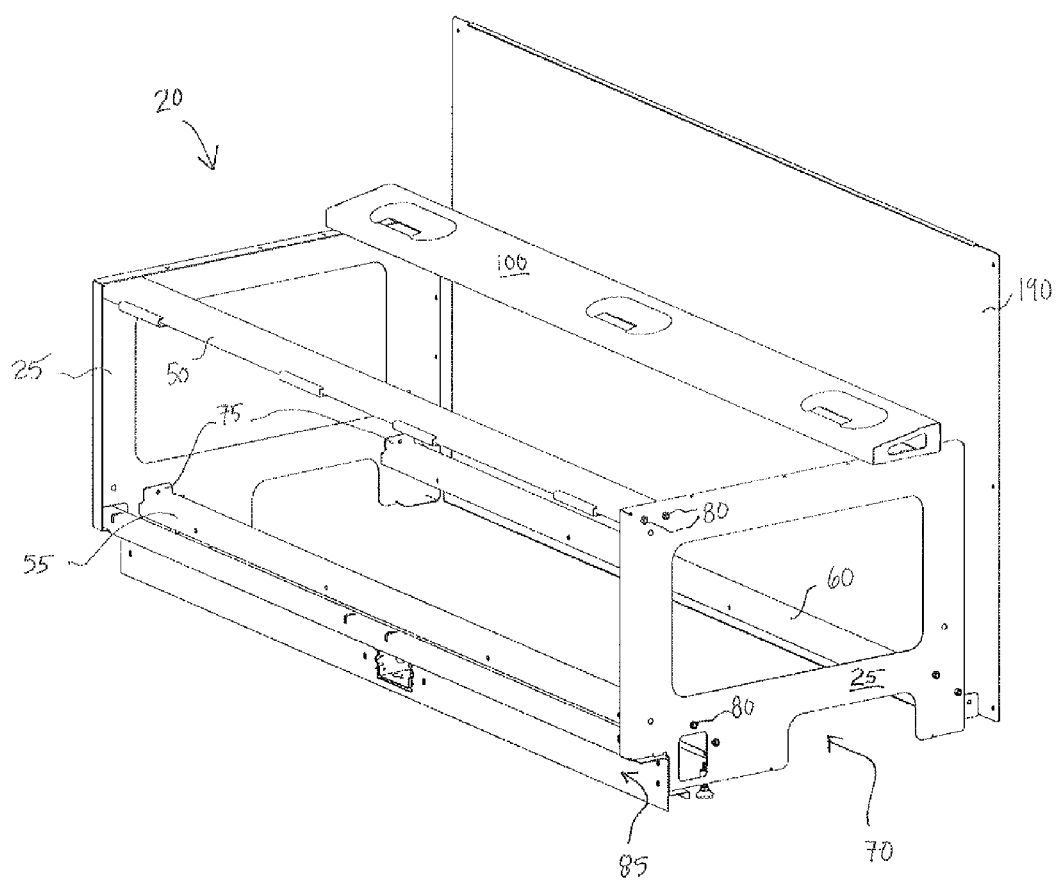
FIG. 4 is a perspective view of the cabinet structure of the embodiment shown in FIG. 1.

Having reference to FIG. 4, first upper stringer 50 extends between frame ends 25 and is typically located at or proximate the upper edges of frame ends 25 in order to maximize the interior space of the cabinet structure 20. Similarly, first lower stringer 55 is preferably located at or proximate the lower edges of frame ends 25. In addition, first upper stringer 50 and first lower stringer 55 can be located near or at the front side of cabinet structure 20 to strengthen and rigidify the front side.

Figure 2:
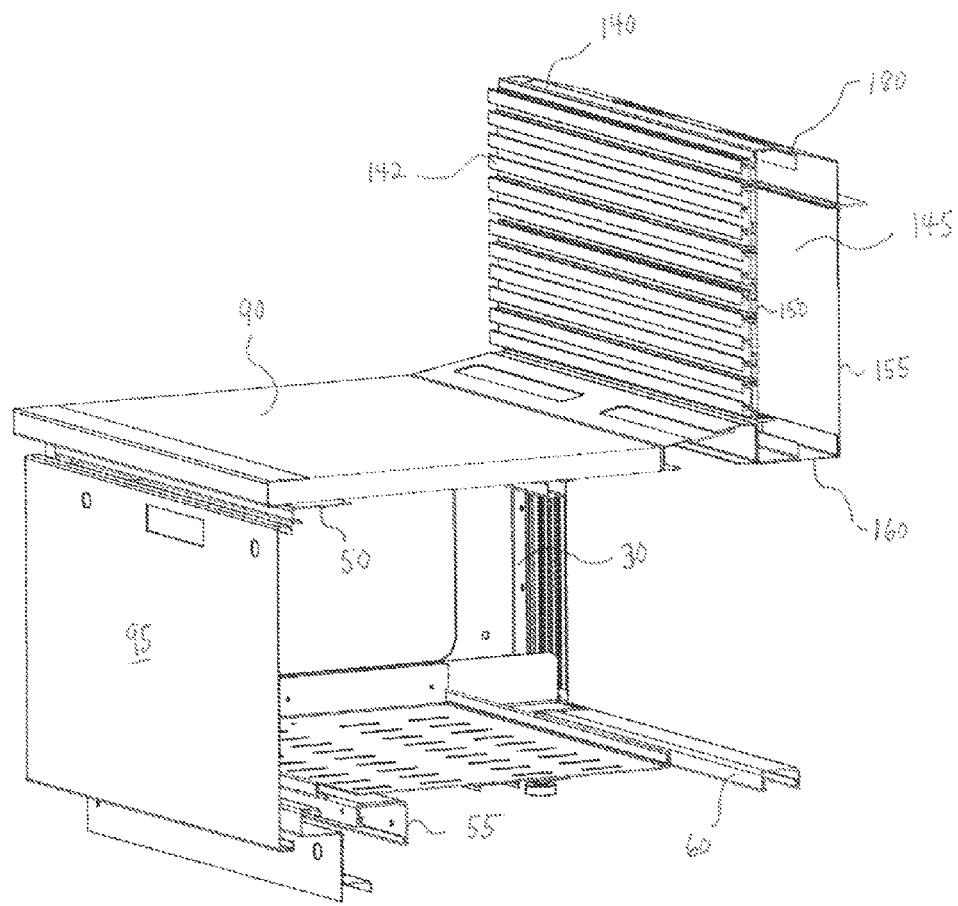
FIG. 2 is a perspective cross sectional view of the embodiment shown in FIG. 1 taken along line 2-2 of FIG. 1.

As with frame ends 25, stringers 50 and 55 can also be shaped and dimensioned to be relatively compact with the object of maximizing the interior space of the cabinet. As best shown in FIG. 2, which shows a cross sectional view of console 10, in at least one embodiment stringers 50 and 55 can have a small or thin cross section, and can be made of a thin material. The stringers can also comprise one or more longitudinal bends or junctions along their longitudinal axes for improved rigidity. For instance, as shown in FIG. 2, first upper and first lower stringers 50 and 55, respectively, have a J-shaped cross section. In addition, a small portion of each edge of first lower stringer 55 is folded over approximately 180 degrees to provide additional rigidity. Those skilled in the art will appreciate, however, that the stringers can have other suitable shapes. Each stringer can also have one or more apertures therein for mounting or connection purposes.

Stringers 50 and 55 can be connected to frame ends 25 in any suitable manner known in the art. However, in some instances it may be desirable to employ connections means that take up minimal space. As shown in FIGS. 1 and 4, in at least one embodiment, each stringer has a tab or flange 75 extending from both of its ends. These flanges 75 are connected to frame ends 25 using one or more fasteners 80, but could also be connected by one or more welds, or by any other suitable method known in the art.

Figure 3:
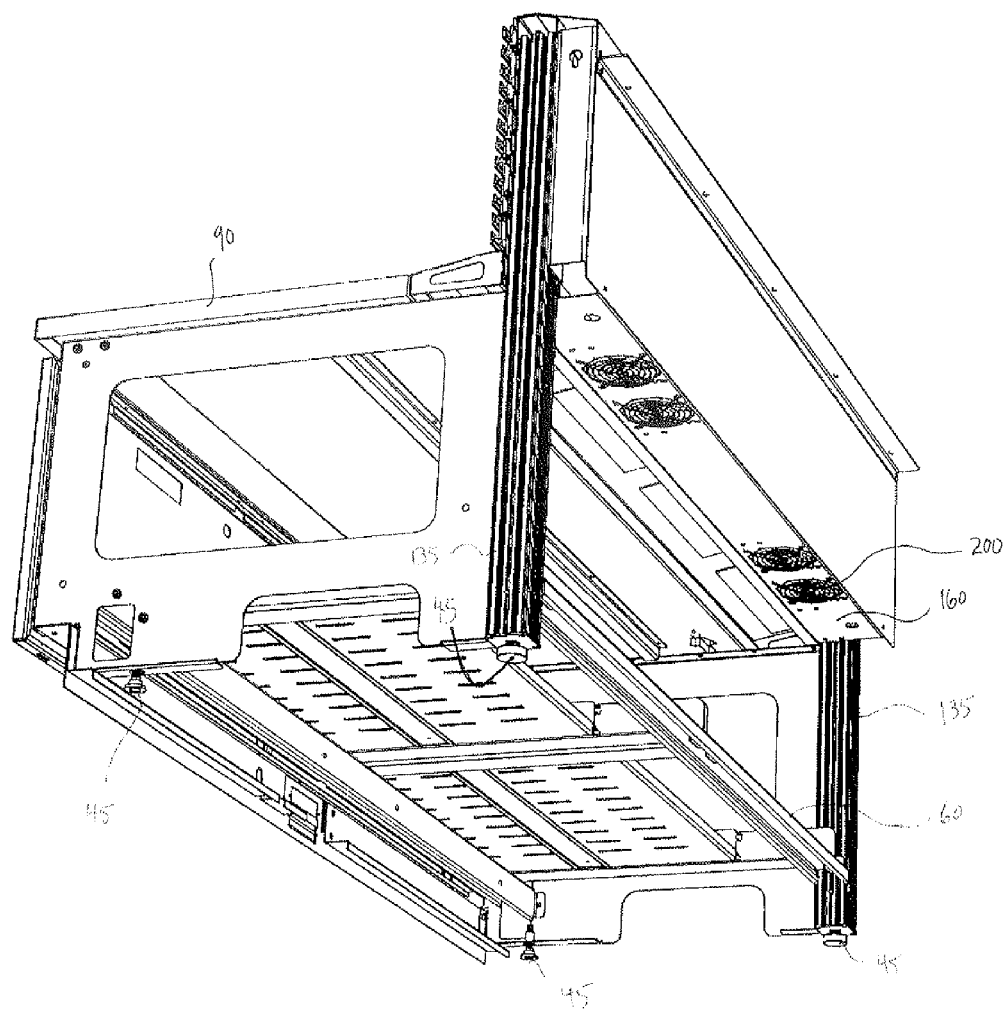
FIG. 3 is a lower rear perspective view of a slightly different embodiment of the console.

In addition to first upper and first lower stringers 50 and 55, respectively, cabinet structure 20 may comprise additional stringers to further strengthen the cabinet structure. For example, as shown in FIGS. 1 and 2, cabinet structure 20 can have a second lower stringer 60 positioned near the back side of cabinet structure 20. This second lower stringer 60 connects the lower rear portions of frame ends 25 and serves to brace the lower back region of cabinet structure 20. In an alternative, as shown in FIG. 3, second lower stringer 60 can be connected to posts 135 rather than to frame ends 25. Connecting second lower stringer 60 to posts 135 would achieve the similar result of bracing the lower back side of cabinet structure 20 since the back edges of frame ends 25 are typically connected to posts 135, as described below.

Support structure 130 is connected to the back side of cabinet structure 20. As will be described below, support structure 130 comprises a pair of spaced apart posts 135. In at least one embodiment, as shown in FIG. 1, posts 135 are connected to the back edges of frame ends 25. Connecting posts 135 to the back edges of frame ends 25 contributes to the overall rigidity and strength of the console. As can be seen in FIG. 2, in one embodiment the back edge of each frame end 25 comprises a lip or flange 30 that acts as a mating and connection surface. Flange 30 can be connected to post 135 in any suitable manner known in the art, including by way of one or more fasteners or welds. In one embodiment, each post 135 can define one or more T-shaped ports or slots that extend longitudinally at the surface of the post for the purpose of connecting one or more pieces or objects to the post. The port is adapted to slidably receive one or more nuts and to prevent any rotation of the nuts. In particular, a nut can be inserted into the port and moved to wherever it is needed. An object may then be fastened to post 135 by way of a bolt, the end of which is inserted into the port to threadably engage the nut. As mentioned, the port prevents any rotation of the nut and therefore allows for the tightening of the connection.

Since frame ends 25 and the various stringers are integral structural components of cabinet structure 20, they will typically be made out of a strong and rigid material or materials. Such materials include but are not limited to metals, including steel and aluminum. However, those skilled in the art will appreciate that other suitable materials can be used.

As best shown in FIG. 1, cabinet structure 20 can also comprise a work surface structure 90. In addition to providing a surface onto which equipment and other objects may be placed, work surface structure 90 can also serve a structural function by bracing and strengthening console 10. In at least one embodiment, work surface structure 90 is in the form of a plate or panel and extends between frame ends 25. However, those skilled in the art will appreciate that work surface structure 90 can take other shapes and forms. For example, in at least one alternative, the top side of cabinet structure 20 can comprise one or more additional stringers or other braces rather than the plate-shaped work surface structure 90 shown in the Figures. In addition, work surface structure 90 can be made of any suitable material known in the art, including but not limited to wood, metal, plastic or a combination thereof.

Console 10 can also have one or more cable access and management features. For instance, as shown in FIG. 1, console 10 can comprise an upper raceway 100 disposed at the top of cabinet structure 20 proximate support structure 130. Upper raceway 100 has at least one aperture 105 in its upper surface for the passage of cabling between the interior space 65 of cabinet structure 20 and the external environment of the cabinet. In at least one embodiment, raceway 100 will have a substantially open bottom providing access to interior space 65 of cabinet 20. In addition, upper raceway 100 can be fitted with one or more connectors, such as power outlets and data ports. Furthermore, raceway 100 can extend between frame ends 25 and have open end portions to allow for the passage of cabling between adjacent consoles. Raceway 100 can also serve as a structural component of cabinet structure 20, for example to brace frame ends 25.

Cabinet structure 20 may also have additional raceways or cable management features. Having regard to FIG. 1, cabinet structure 20 can comprise or define a lower opening or channel 70 to allow console 10 to be installed over existing floor-mounted cabling or other equipment. As shown in FIG. 1, channel 70 need not be defined by one or more walls, but can merely comprise an open space. Channel 70 can extend longitudinally in cabinet structure 20. In addition, in at least one embodiment, channel 70 can extend the full length of cabinet structure 20. Furthermore, as shown in FIG. 1, the lower edge of at least one frame end 25 can define a recess 35 that is in substantial alignment with channel 70 to form an open end of channel 70.

In addition, cabinet structure 20 can comprise a lower raceway 110 positioned at or near the front side of the cabinet and extending between frame ends 25. Lower raceway 110 can be open to one or more junction boxes 115 at the front lower side of cabinet structure 20. The one or more junction boxes 115 can be fitted with any type of electrical connection, such as a power outlet or a data port. Furthermore, the lower front side of cabinet structure 20 can define a recessed portion 85, which may extend the full length of the cabinet. Recessed portion 85 can provide a space to accommodate a person's feet, thereby enabling the person to get closer to the console.

As shown in FIG. 2, cabinet structure 20 can comprise one or more panels 95 at its front side to substantially or fully close its front side. Panel 95 can be in the form of a door to provide convenient access to the interior space of the cabinet. Although not shown, one or more panels 95 can have one or more louvers or vents to aid in ventilating interior space 65 of the cabinet. As will be appreciated by those skilled in the art, a door can be connected to cabinet structure in any suitable manner, including by way of one or more hinges, sliders, clips, or pins. In addition, console 10 may comprise one or more feet 45 as shown in FIGS. 1 and 3. The one or more of feet 45 can be adjustable to allow for the levelling of the console or for the alignment of the console with an adjacent console. Furthermore, cabinet structure 20 can be fitted with or otherwise comprise shelving or mounting hardware for supporting equipment or other objects within the cabinet.

In addition to cabinet structure 20, the console of the present invention also comprises a support structure. One embodiment of support structure 130 is shown in isolation in FIG. 5. Having reference now to FIG. 1, support structure 130 is disposed at the back side of cabinet structure 20 and generally comprises two spaced apart and vertically extending posts 135, and a lateral support 140 extending between and connected to the posts. The strength and rigidity of the console is achieved at least partly through the combination of the cabinet structure with the support structure. In particular, the cabinet structure and the support structure brace and support one another, thereby producing an overall strong and rigid structure.

For descriptive purposes, each post 135 is described as having a lower portion and an upper portion. The lower portion extends along the back side of cabinet structure 20, whereas the upper portion extends above the top side of cabinet structure 20. Lateral support 140 extends between and is connected to the upper portion of posts 135. Furthermore, as shown in FIG. 1, in at least one embodiment posts 135 extend right to the bottom edge of frame ends 25. In this way, at least part of a load borne by posts 135 is transferred directly to the floor rather than to cabinet structure 20.

As mentioned above, console 10 is generally adapted to support equipment or other objects from support structure 130. The load of any equipment is at least partly borne by lateral support 140 and posts 135. Therefore posts 135 shall generally be of sufficient strength and rigidity to support the load of any such equipment. Of course the necessary strength and rigidity requirements can vary according to the end user's specifications. Posts 135 can take any suitable form and can be made of any suitable material known in the art. In at least one embodiment, as shown in the Figures, posts 135 are in the form of aluminum extrusions, which usually provide an attractive strength to weight ratio. However, those skilled in the art will appreciate that posts 135 may be in any other shape or form, and may be made of any other suitable material.

As previously described, lateral support 140 extends between the upper portions of posts 135. An important function of lateral support 140 is to support mounting means for mounting equipment on the console, typically above cabinet structure 20 of the console. Mounting means will generally be positioned to the front side of lateral support 140, meaning on the same side as cabinet structure 20. However, mounting means can also be positioned at any other suitable location on support structure 130, including on the top and back sides of support structure 130. Having reference to FIG. 1, in at least one embodiment the mounting means are in the form of a slatwall 142. A slatwall typically comprises a wall-like structure having one or more parallel lips or grooves formed thereon. Those skilled in the art will appreciate however that the mounting means may take any other suitable form known in the art, including but not limited brackets, clips, hooks, and other types of mounting surfaces such as pegboard, slot wall, wall track and rail panel. It will be further appreciated that lateral support 140 may be separate from the mounting means, or that the mounting means may itself form lateral support 140. For example, slatwall 142 may also constitute lateral support 140. In such a case, a separate lateral support member is not required.

Furthermore, console 10 can comprise a ventilation duct for the ventilation of interior space 65 of cabinet structure 20. It may be desirable or necessary to ventilate cabinet structure 20 when interior space 65 of the cabinet houses equipment that generates moderate or high amounts of heat. Furthermore, the ventilation may be either natural or forced. The ventilation duct will typically extend upwardly from cabinet structure 20 and will be in fluid communication with interior space 65 of the cabinet. In at least one embodiment, as best shown in FIG. 2, a ventilation duct 145 can be integrated with or into support structure 130. In this embodiment, duct 145 extends the length of support structure 130 and console 10. In addition, ventilation duct 145 can constitute lateral support 140 where duct 145 extends between both posts 135. However, in such a case, duct 145 will need to be sufficiently strong and rigid to provide the necessary structural integrity to the support structure 130. Where duct 145 doubles as lateral support 140, a separate lateral support piece is not required.

Figures 6A, 6B:
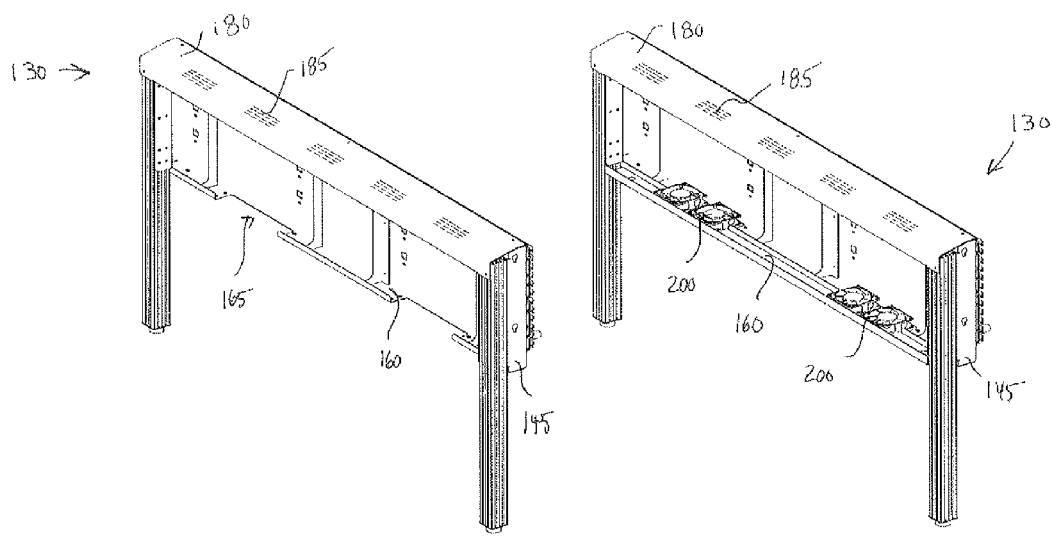
FIG. 6A is a rear perspective view of one embodiment of the support structure showing the ventilation duct.
FIG. 6B is a rear perspective view of another embodiment of the support structure showing the ventilation duct and a plurality of fans.

Having reference again to FIG. 2, in this embodiment ventilation duct 145 comprises and is defined by first and second spaced-apart walls 150 and 155, respectfully. The mounting means, such as slatwall 142, can form first wall 150 of duct 145, or first wall 150 can itself be a separate wall. As best shown in FIGS. 3, 6A and 6B, lower portion of duct 145 is at least partly open to provide fluid communication with interior space 65 of cabinet structure 20. The bottom of duct 145 can be substantially or fully unobstructed. Alternatively, as shown in FIGS. 6A and 6B, the bottom of duct 145 can comprise a bottom wall 160 having at least one aperture therein 165. Where forced ventilation is desired, one or more fans 200 can be disposed at the one or more apertures 165. In addition, the top of ventilation duct 145 can have a wall or cap 180 comprising one or more vents 185. Cap 180 can be sloped downwardly away from the front side of support structure 130 to discourage the placement of objects such as beverages on the cap.

Figure 5:
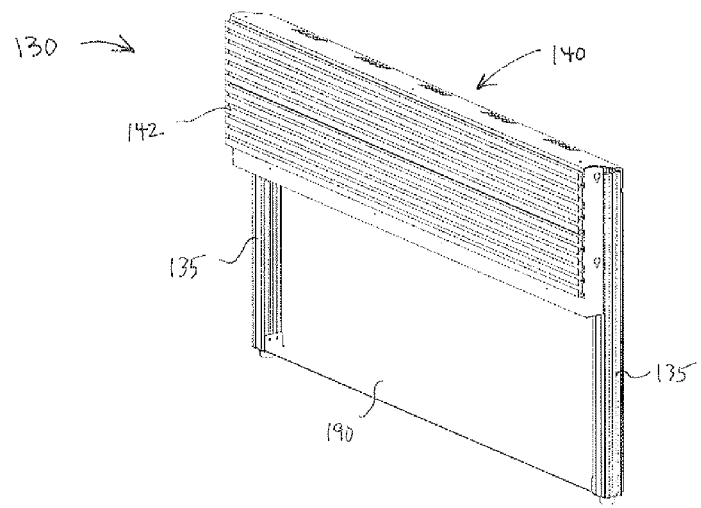
FIG. 5 is a perspective view of the support structure of the embodiment shown in FIG. 1.

As will be appreciated by those skilled in the art, cabinet structure 20 will need to be partly or substantially closed to achieve an effective ventilation system to ventilate interior space 65 of cabinet structure 20. In addition to closing the front and top sides of cabinet structure 20 with one or more panels 95 and work surface structure 90, respectfully, it will typically be necessary to close the back side of the cabinet with a panel or other closure member. For example, FIGS. 4 and 5 show one such panel 190. It may also be necessary or desirable to close one or more apertures 40 in frame ends 25. It will be further appreciated that cabinet structure 20 may also comprise one or more vents or openings (not shown) to serve as air intake vents to permit cooler air to be drawn into interior space 65 of the cabinet. In at least one embodiment, the one or more intakes will be positioned at the lower front side of cabinet structure 20 so that air flows diagonally across interior space 65 of the cabinet to the upper back side of the cabinet, which is generally where the lower end of ventilation duct 145 is located. Furthermore, as mentioned above, the one or more panels 95 can have one or more louvers or vents to aid in ventilating the cabinet.

Turning now to FIGS. 7A to 8B, the dimensions of the present console are discussed. As previously mentioned, one of the objects of the present invention is to provide a console having reduced dimensions, and in particular having reduced height or depth. FIGS. 7A and 8A show a prior art console 400 that is representative of many existing consoles. Console 400 is capable of receiving one or more pieces of electronic equipment therein, and the top of console 400 defines a work surface 405. The height of work surface 405 and the depth of console 400 are within the typical ranges for most consoles and desks. The outline of a person along with the person's sightlines over console 400 are shown. The only difference between FIGS. 7A and 8A is that FIG. 8A shows a display 300 mounted to an upper support 410 of the console.

In contrast, FIGS. 7B and 8B show one embodiment 510 of the console of the present invention. The smaller dimensions of console 510 relative to prior art console 400 are immediately apparent. Most importantly, both the height and the depth of console 510 are smaller, thereby providing a person with improved sightlines over the console when compared to the sightlines achieved with prior art console 400. Although the exterior height and depth of the cabinet structure 520 are smaller than those of console 400, cabinet structure 520 is capable of receiving a considerable amount of electronic and other equipment (not shown). Furthermore, because the height of the top of cabinet 520 is low, any equipment or writing surfaces can be mounted on support structure 630 of console 510 so that the equipment is positioned at a useful and effective location for a person. Although FIGS. 7B and 8B show the outline of a person in a standing position, it will be appreciated that console 510 also provides greater sightlines compared to prior art console 400 for a person in a sitting position.

In at least one embodiment, the console of the present invention has an overall height not exceeding about 32 inches. In addition, in at least one embodiment the console of the present invention has an overall depth not exceeding about 27 inches. In addition, in at least one embodiment cabinet structure 20 of the console of the present invention has an overall height not exceeding about 19.5 inches. In addition, in at least one embodiment cabinet structure 20 has an overall height not exceeding about 16 inches.

Furthermore, console 10 can be adapted to make it connectable to additional consoles at one of or both of its ends. This would allow two or more consoles to be joined end-to-end to form a longer console system.

It will be appreciated that console 10 can be used in any application where there is a need or where it is otherwise desirable to permit a person positioned at the console to see over the console at a downwardly angle. Such applications include but are not limited to air traffic control towers, bridges of ships and other vessels and vehicles, prison control rooms, rail yard control towers, and various other types of monitoring and control centres.

The previous detailed description is provided to enable any person skilled in the art to make or use the present invention. Various modifications to those embodiments will be readily apparent to those skilled in the art, and the generic principles defined herein may be applied to other embodiments without departing from the spirit or scope of the invention described herein. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

What is claimed:

1. A console structure for supporting equipment, the console comprising:
    a cabinet structure having a front side, a back side and a top side, the cabinet structure comprising:
        two spaced apart frame ends, each frame end being a substantially planar, unitary, polygonal element and each frame end extending substantially the height and the depth of the cabinet;
        a first upper stringer disposed between and connected to the frame ends and positioned at a spaced apart location from the back side of the cabinet structure; and
        a first lower stringer disposed between and connected to the frame ends and positioned at a spaced apart location from the back side of the cabinet structure,
        wherein the cabinet structure defines an interior space for receiving equipment;
    a support structure disposed at the back side of the cabinet structure, the support structure comprising:
        two spaced apart posts, each post having an upper portion and a lower portion, the upper portions of the posts extending above the top side of the cabinet structure, and the lower portion of each post connected to a one of the frame ends; and
        a lateral support having a front side and a back side, and being disposed between and connected to the upper portions of the posts; and
    a ventilation duct extending upwardly from the cabinet structure and in fluid communication with the interior space of the cabinet structure;
    wherein a back edge of at least one frame end comprises a flange which substantially extends the height of the frame end, and wherein the at least one flange is connected to a front, lower portion of at least one of the posts.

2. The console of claim 1 wherein at least one of the frame ends defines an aperture thererthrough.

3. The console of claim 1 further comprising a second lower stringer disposed between and connected to the frame ends, and positioned between the first lower stringer and the back side of the cabinet structure.

4. The console of claim 1 wherein at least one of the first upper stringer and first lower stringer is formed substantially of sheet material, comprises at least one bend or junction formed substantially along a longitudinal axis of the stringer, and has an open cross section, the cross section taken transversely to the longitudinal axis of the stringer.

5. The console of claim 3 wherein the second lower stringer is formed substantially of sheet material, comprises at least one bend or junction formed substantially along a longitudinal axis of the second lower stringer, and has an open cross section, the cross section taken transversely to the longitudinal axis of the second lower stringer.

6. The console of claim 1 wherein a bottom side of the cabinet structure defines a channel to allow the cabinet structure to be installed over floor-mounted equipment.

7. The console of claim 6 wherein the channel extends the full length of the cabinet structure.

8. The console of claim 6 wherein a bottom edge of at least one of the frame ends defines a recess to form an open end of the channel.

9. The console of claim 1 wherein the cabinet structure further comprises a lower raceway extending between the frame ends.

10. The console of claim 1 wherein at least one post of the support structure is in the form of an extrusion.

11. The console of claim 1 wherein the support structure comprises mounting means for mounting equipment from the support structure.

12. The console of claim 11 wherein the mounting means are in the form of a slatwall.

13. The console of claim 1 wherein the cabinet structure further comprises a work surface structure disposed at and connected to the top side of the cabinet structure.

14. The console of claim 1 further comprising at least one panel at the front side of the cabinet structure to substantially close the front side of the cabinet structure.

15. The console of claim 1 further comprising an upper raceway disposed at the top side of the cabinet structure.

16. The console of claim 15 wherein the upper raceway defines at least one aperture for the passage of cabling between the interior space of the cabinet structure and an external environment above the cabinet structure.

17. The console of claim 1 wherein the ventilation duct extends upwardly from the cabinet structure at or proximate the back side of the cabinet structure.

18. The console of claim 1 wherein the ventilation duct is integrated into the support structure.

19. The console of claim 1 wherein the ventilation duct comprises first and second spaced apart walls extending between and coupled to the posts of the support structure.

20. The console of claim 1 further comprising a cap at a top of the ventilation duct, the cap sloping downwardly away from the front of the side of the lateral support and having at least one aperture therethrough for the passage of air between the ventilation duct and an external environment of the ventilation duct.

21. The console of claim 1 further comprising at least one fan for forcing the movement of air between the interior space of the cabinet and the ventilation duct.

22. The console of claim 1 wherein the ventilation duct comprises a bottom wall portion defining at least one aperture therethrough for the passage of air between the interior space of the cabinet structure and the ventilation duct.

23. The console of claim 22 further comprising a fan disposed at a one of the at least one apertures in the bottom wall portion of the ventilation duct for forcing the movement of air between the interior space of the cabinet and the ventilation duct.

24. The console of claim 1 wherein at least one end of the console is connectable to an end of a second console.

25. The console of claim 1 having a height not exceeding about 32 inches.

26. The console of claim 1 wherein the height of the cabinet structure does not exceed about 19.5 inches.

27. The console of claim 1 wherein the height of the cabinet structure does not exceed about 16 inches.

28. The console of claim 1 having a depth not exceeding about 27 inches.

* * * * *